United States Patent Office 3,505,056
Patented Apr. 7, 1970

3,505,056
USE OF ISOCHLORTETRACYCLINE IN RIPENING SUGARCANE AND COMPOSITIONS USEFUL THEREIN
Louis G. Nickell and Tyrus Tanimoto, Honolulu, Hawaii, assignors to Hawaiian Sugar Planters' Association, Honolulu, Hawaii, a voluntary, nonprofit agricultural organization
No Drawing. Filed Dec. 18, 1967, Ser. No. 691,227
Int. Cl. A01n 5/00
U.S. Cl. 71—88                                           5 Claims

ABSTRACT OF THE DISCLOSURE

Sucrose yield of sugarcane is increased, and more particularly the relative proportion of non-sucrose components in the cane is reduced, by treating the younger, growing parts of the cane stalk with isochlortetracycline (isoaureomycin).

BACKGROUND OF THE INVENTION

Considerable progress has been made in the last several years in increasing the sugar yield of sugarcane by improvement of the varieties of cane being planted, by enrichment of the soil with fertilizers and by irrigation where natural moisture was insufficient for optimum plant growth. More recent efforts in improving sugar production have increasingly turned toward the use of chemicals in modifying and controlling physiological processes of sugarcane, particularly its ripening prior to harvest. See U.S. Patents 3,224,865; 3,245,775, and 3,291,592. However, especially in the case of chlorinated compounds, there has been some concern about their resistance to breakdown in the plant and their persistence in the soil. Consequently, though some such compounds have heretofore been approved for use in herbicides under conditions where direct application to an edible crop is kept at a minimum, their deliberate application to an edible crop has generally been viewed with misgivings pending proof of their non-toxicity.

Extensive efforts therefore continue to be made in searching for effective but less controversial chemical agents for controlling the ripening of sugarcane so as to increase the sucrose yield therefrom. Generally speaking, chemicals selected for evaluation have been of a type which has been previously found active in work with other plants as a plant hormone, herbicide or inhibitor of growth of terminal buds, or active in killing the spindle of cane upon topical microapplication, etc.

However, among the compounds previously known to be useful for such other special purposes only a few have been found effective in controlling the ripening of sugarcane in the desirable manner. Moreover, no relationship has been recognized to date between the chemical structure of such compounds and (a) their phytotoxic effects, (b) their physiological effects on the morphogenetic development of the plant, and (c) their activity in having positive effects on ripening. In other words, the effectiveness of a compound in controlling the ripening of sugarcane and thereby increasing sugar yield remains essentially unpredictable.

It is an object of this invention to provide a new type of agent for controlling the ripening of sugarcane. A more specific object is to increase the sucrose yield of sugarcane by chemically treating it during its final ripening stages prior to harvest without introducing substantial toxicological hazards. Still more specifically it is an object of this invention to increase the sucrose yield of sugarcane by treating it prior to harvest with a chemical agent which is sufficiently stable to provide the desired effect over a period of several weeks and thereby give adequate operational flexibility, but yet has a relatively low degree of persistence and is susceptible to autodecomposition or to decomposition by soil bacteria. Compounds which increase the sucrose content only temporarily over a period of two or three weeks after application and then result in a substantial decrease are generally not desirable for the intended purpose.

SUMMARY OF INVENTION

It has now been discovered that excellent results in increasing the sucrose yield of sugarcane can be obtained by treating the younger, growing parts of the cane stalk with isochlortetracycline.

The preferred usage form is a mixture containing the isochlortetracycline in an aqueous solution or suspension utilizing one or a combination of surface active agents variously known as wetting agents, detergents or emulsifying agents. Isochlortetracycline, which is the active material on the use of which the present invention is based, has a structure corresponding to the following formula

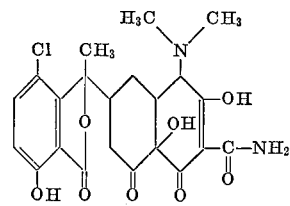

The present discovery of the ripening effects of this compound, previously known to have growth stimulatory activity for plants as taught for instance in U.S. Patent 2,907,650, is quite astonishing since all chemicals heretofore found to be active in ripening sugarcane have not been of the growth stimulant type but on the contrary have generally exhibited growth inhibitory effects if they had any observable gross growth effects at all. In fact, several active compounds heretofore proposed to enhance sugarcane ripening, such as 2,3,6-trichlorobenzoic acid, substituted amine salts of endothal, and others, are active herbicides.

Isochlortetracycline can be made from the antibiotic chlortetracycline by mild alkaline hydrolysis at room temperature as described for instance by Pruess et al., Encyclopedia of Chemical Technology, vol. 13, page 776 (1954). Unlike chlortetracycline, isochlortetracycline has none of the microbiological activity associated with an antibiotic.

In accordance with this invention, the sugarcane crop is treated with isochlortetracycline or with a composition containing same at any time some two to ten weeks before harvest, the preferred time for treatment being between about three and eight weeks prior to harvest.

Good results are obtained when sugarcane crop is treated at a rate in the range of from 1 to 4 pounds per acre of sugarcane, through higher rates (e.g., up to about 10 pounds or more per acre) or rates lower than 1 pound per acre can also be effective. The optimum amount will vary somewhat depending on the environmental conditions, time of year, and age and variety of cane being treated, but can be readily determined for each particular case by preliminary testing.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane. In preparing suitable liquid compositions, surface active agents of the type described for instance in U.S. Patent 3,224,865, column 2, lines 61–66 or in U.S. Patent 3,245,775, column 2, lines 57–64 are convenient to use. The preferred surfactants for use in liquid compositions of the present invention are those of the non-ionic type, e.g., alkyl phenoxy poly(ethylene-oxy)ethanols such as adducts of nonyl-phenol and ethylene oxide; trimethyl nonyl polyethylene glycol ethers; polyethylene oxide adducts of fatty and resin acids, and long chain alkyl mercaptan adducts with ethylene oxide.

With the type of boom-spray apparatus used in this work, it has been found convenient to apply the isochlortetracycline to the sugarcane field in the form of aqueous solutions, suspensions or emulsions having a concentration of active agent such that the application at the rate of from 5 to 20 gallons of liquid composition per acre will provide the required dosage of active chemical. However, the use of lower or higher gallonages may be preferred when a different dispensing mechanism is used.

The preferred carrier for the isochlortetracycline is water to which about 0.1 to 2% by weight of surface active agent has been added. However, instead of using water as the carrier, non-phytotoxic mineral oils either as such or in the form of water-in-oil or oil-in-water emulsions may be used similarly as is otherwise well known in the art of treating vegetation with beneficial growth control agents.

DESCRIPTION OF SPECIFIC EMBODIMENTS

Example I

Three pounds of isochlortetracycline was dissolved in 20 gallons of water to which was added 0.25% (w./w.) of a surface active agent, nonyl phenylpolyethylene glycol ether condensed with ethylene oxide (Tergitol NPX). This solution was applied to field grown cane 5 weeks before harvest with a boom-spray at the rate of 3 pounds of isochlortetracycline per acre.

After samples of the above sugarcane were harvested, the top 15 joints of cane of the sampled stalks were cut off and comparisons made with similar samples from untreated cane. The analyses were made and the effects on juice purity and pol percent cane are given below:

|  | Juice purity | Pol percent cane |
|---|---|---|
| Control (untreated) | 76.95 | 10.63 |
| Isochlortetracycline | 82.00 | 11.77 |

It can be seen that application of isochlortetracycline gave a very substantial increase in juice purity as well as in pol percent cane. The analyses in this and all the other examples were carried out by the so-called "press method" developed by T. Tanimoto, Hawaiian Planters' Record 57, 133 (1964). Pol percent cane is a polarimetric determination and equals the percentage of sucrose if the latter is the only substance in the solution which will rotate the plane of polarized light. In any event, determination of pol percent cane is a standard and effective method for determining the sucrose content of sugar cane juice.

Example II 38 mg. of isochlortetracycline was dissolved in a small amount of water that contained about 0.25% (w./w.) of the dodecylether of polyethylene glycol and this solution was applied to each tip of 20 stalks of sugarcane. 10 stalks were harvested 4 weeks later and 10 were harvested 5 weeks later. The top 15 joints of the treated cane as well as those of similar untreated cane were removed, combined, and analyzed as described previously. The results are given below:

|  | 4 weeks | | 5 weeks | |
|---|---|---|---|---|
|  | Juice purity | Pol percent cane | Juice purity | Pol percent cane |
| Control (untreated) | 75.78 | 8.98 | 69.28 | 7.13 |
| Isochlortetracycline | 83.89 | 11.12 | 85.57 | 11.56 |

Again, a substantial improvement in sugar yield was obtained when the sugarcane was harvested four or five weeks after isochlortetracycline treatment.

Example III

The stalk treatment, removal of top joints and analysis described in Example II were repeated in the same sugarcane area on other stalks after an interval of 150 days, with the following results:

|  | 4 weeks | | 5 weeks | |
|---|---|---|---|---|
|  | Juice purity | Pol percent cane | Juice purity | Pol percent cane |
| Control (untreated) | 76.30 | 8.58 | 76.48 | 8.74 |
| Isochlortetracycline | 80.85 | 10.12 | 84.87 | 10.94 |

The results obtained in this example show that the benefits which the present invention provides can be obtained with similar effect at various stages of natural maturity of the sugarcane treated.

Example IV

The procedure of Example II was applied to a different commercial variety of sugarcane with comparable results, as shown below:

|  | 4 weeks | | 5 weeks | |
|---|---|---|---|---|
|  | Juice purity | Pol percent cane | Juice purity | Pol percent cane |
| Control (untreated) | 69.44 | 6.82 | 72.99 | 8.00 |
| Isochlortetracycline | 74.82 | 8.48 | 74.36 | 8.17 |

The nature, scope, utility and effectiveness of the present invention have been described and specifically exemplified in the foregoing specification. However, it should be understood that these examples are not intended to be limiting and that the true scope of the invention for which protection is to be given is particularly pointed out in the appended claims.

We claim:

1. A process for modifying the ripening of field grown sugarcane so as to increase its yield of sucrose which comprises applying isochlortetracycline to the cane at a time from 2 to 10 weeks prior to harvest, the isochlortetracycline being applied at a rate corresponding to from 1 to 10 pounds of isochlortetracycline per acre.

2. A process according to claim 1 wherein the isochlortetracycline is applied to the cane in admixture with water as a carrier.

3. A process according to claim 1 wherein the isochlortetracycline is applied to the cane in the form of an aqueous solution or suspension at the rate of 5 to 20 gallons of aqueous composition per acre.

4. A process according to claim 3 wherein the aqueous composition contains between 0.1 to 2% by weight of a surface active agent.

5. A process according to claim 3 wherein the aqueous composition contains between 0.1 and 2% by weight of a non-ionic surface active agent.

References Cited

UNITED STATES PATENTS 2,907,650  10/1959  Nickell _____ 71—77

OTHER REFERENCES

Nickell et al., Proc. Hawaiian Sugar Tech. Conf. 24, 152–163 (1965).

LEWIS GOTTS, Primary Examiner

M. M. KASSENOFF, Assistant Examiner

U.S. Cl. X.R.

71—65, 79, 118